UNITED STATES PATENT OFFICE 2,606,184

CHROMIFEROUS MONOAZO-DYESTUFFS

Willy Widmer, Bottmingen, and Jakob Brassel, Basel, Switzerland, assignors to Ciba Limited, a Swiss firm No Drawing. Application February 7, 1949, Serial No. 75,087. In Switzerland February 26, 1948

7 Claims. (Cl. 260—151)

According to this invention valuable new chromiferous monoazo-dyestuffs are made by treating a monoazo-dyestuff containing at least one and at most two —$SO_3H$ groups and of the general formula

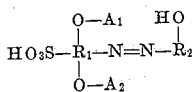

in which $R_1$ represents an aromatic radical of the benzene series, in which the substituents —N=N—, —O—$A_1$ and —O—$A_2$ are in the 1-, 2- and 5-positions, respectively, $A_1$ and $A_2$ each represent an alkyl group, and $R_2$ represents a naphthalene radical containing at most one —$SO_3H$ group and bound to the azo linkage in ortho-position to the hydroxyl group, with an agent yielding chromium under conditions such that the group $A_1$ is split off.

Since in 2-hydroxynaphthalenes coupling takes place always in the 1-position, but never in the 3-position, the expression "ortho-position" used with regard to a naphthalene radical is understood to mean the position 1:2 (or 3:4, 5:6, 7:8) only, but not the position 2:3 (or 6:7).

The monoazo-dyestuffs of the above formula serving as starting materials can be obtained by coupling a diazo-compound of an amine of the general formula

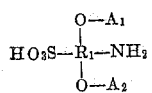

in which $R_1$, $A_1$ and $A_2$ have the meanings given above, and the substituents —$NH_2$, —O—$A_1$ and —O—$A_2$ are in the 1-, 2- and 5-positions, respectively, of the radical $R_1$, with a 2-hydroxynaphthalene capable of coupling in the 1-position or a 1-hydroxynaphthalene capable of coupling in the 2-position or a monosulfonic acid of one of such hydroxynaphthalenes.

In the amines of the above formula serving as diazo-components the radical $R_1$ may be free from further substituents or may contain further substituents, for example, a halogen atom such as fluorine or bromine or especially chlorine.

The two alkyl groups $A_1$ and $A_2$ may be identical or different from one another. The term "alkyl group" includes, besides straight chain aliphatic hydrocarbon radicals, branched aliphatic hydrocarbon radicals and cycloalkyl groups, which may be free from substituents or may contain substituents. Generally speaking, especially good results are obtained with those amines of the above formula which contain only a few, for example, 1 to 4, carbon atoms in the alkyl groups $A_1$ and $A_2$.

As an example of such an amine there may be mentioned: 1-amino-2:5-dimethoxybenzene-4-sulfonic acid (obtainable by baking the acid sulfate of 1-amino-2:5-dimethoxybenzene; a product having the same properties is obtained by sulfonating 1-amino-2:5-dimenthoxybenzene with sulfuric monohydrate or with chlorosulfonic acid in the presence of tetrachlorethane).

As coupling components for making the monoazo-dyestuffs there come into consideration 1-hydroxynaphthalenes capable of coupling in the 2-position or 2-hydroxynaphthalenes capable of coupling in the 1-position, which contain one or no —$SO_3H$ groups. As examples of such compounds there may be mentioned: 4-methyl-1-hydroxynaphthalene, 1 - hydroxynaphthalene-4- or 5-sulfonic acid, 2-hydroxynaphthalene, 6-bromo - 2 - hydroxynaphthalene or 2-hydroxynaphthalene-4- or -5- or -6- or -7- or -8-sulfonic acid.

The diazotization of the amines of the above formula may be carried out by a customary method in itself known, for example, with the aid of sodium nitrite and hydrochloric acid. The coupling of the diazo-compounds with the hydroxynaphthalene compounds of the kind described above is advantageously carried out in an alkaline medium. If desired, the coupling may be carried out in the presence of a suitable solvent such as alcohol or pyridine.

Especially valuable chromiferous dyestuffs are obtained, for example, with the use of the monoazo-dyestuffs of the general formula

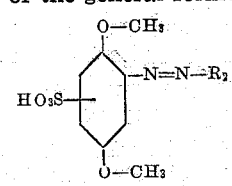

in which $R_2$ represents the radical of a 1-hydroxynaphthalene or 1-hydroxynaphthalene monosulfonic acid bound in the 2-position to the azo linkage or advantageously the radical of a 2-hydroxynaphthalene (for example, 2-hydroxynaphthalene itself) or 2-hydroxynaphthalene monosulfonic acid bound in the 1-position to the azo linkage. Among these dyestuffs those which are obtainable from diazotised 1-amino-2:5-dimethoxybenzene-4-sulfonic acid are of special interest owing to the easy accessibility of the diazo-component, on the one hand, and owing to the favorable dyeing properties of the chromiferous dyestuffs (which yield, for example, very level dyeings on wool), on the other.

The monoazo-dyestuffs serving as starting materials may, if desired, be isolated from the coupling mixture and freed from impurities. In general, however, the coupling mixture as a whole and without any intermediate separation may be used for the treatment with the agent yielding chromium. As a rule it is necessary in this case, before carrying out the reaction with the agent yielding chromium, to adjust the pH of the coupling mixture to a value favorable for the reaction, that is to say by giving it a weakly acid reaction with a mineral acid.

As agents yielding chromium there come into consideration above all salts of trivalent chromium such as chromium fluoride, chromium sulfate, chromium acetate and chromium formate. The treatment with the agent yielding chromium is carried out under conditions such that the alkyl group $A_1$ is split off. This splitting off with the simultaneous formation of the complex chromium compound may be carried out by a method in itself known by treatment with an agent yielding chromium, for example, with chromium formate or chromium sulfate in an aqueous medium, under passure at a raised temperature, for example, at a temperature ranging from 110° C. to 140° C.

The chromiferous dyestuffs obtainable by the process of the invention are new. They are complex chromium compounds of monoazo-dyestuffs which contain at least one and at most two —$SO_3H$ groups and are of the general formula

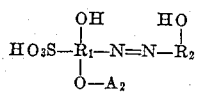

in which $R_1$ represents an aromatic radical of the benzene series in which the substituents —N=N—, —OH and —O—$A_2$ are in the 1-, 2- and 5-positions respectively, $A_2$ represents an alkyl group, and $R_2$ represents a naphthalene radical containing at most one —$SO_3H$ group and bound to the azo linkage in ortho-position to the hydroxyl group.

These compounds are suitable above all for dyeing materials of animal origin such as silk, leather and especially wool and also for dyeing artificial fibers and superpolyamides or superpolyurethanes. The dyeings obtainable therewith are distinguished by their good fastness to washing, fulling and light. As compared with the known products of similar constitution, the new products are in general principally distinguished in that they yield very level dyeings.

The following examples illustrate the invention, the parts and percentages being by weight:

*Example 1*

23.3 parts of 2:5-dimethoxy-1-aminobenzene-4-sulfonic acid are diazotized in the usual manner with 7 parts of sodium nitrite in the presence of 19 parts of hydrochloric acid of 30 per cent. strength. The diazo compound is run into a solution cooled to 15° C. of 23 parts of 1-hydroxynaphthalene-5-sulfonic acid and 40 parts of anhydrous sodium carbonate in 400 parts of water, while stirring. The resulting dyestuff may be precipitated by the addition of sodium chloride and separated by filtration. The dyestuff corresponds to the formula

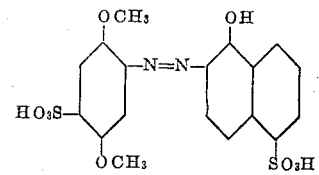

When dry it is a red-brown substance which dissolves in dilute sodium carbonate solution with a red coloration and in concentrated sulfuric acid with a blue coloration, and dyes wool from an acid bath red tints.

The dyestuff may be converted, advantageously without preliminary drying, into its complex chromium compound. For this purpose, the dyestuff paste obtained as described above is stirred in 1000 parts of hot water and sufficient sulfuric acid of 10 per cent strength to produce a weakly acid reaction with a mineral acid. After the addition of a quantity of basic chromium sulfate ($Cr.OH.SO_4$) containing 5.7 parts of Cr, the reaction mixture is heated at 120–125° C. in a lead-lined autoclave fitted with stirring mechanism and stirred for 15 hours at that temperature. The resulting solution of the chromium compound is evaporated to dryness under reduced pressure. In the dry state the dyestuff is a dark colored substance which dissolves in dilute sodium carbonate solution with a violet coloration and in concentrated sulfuric acid with a green coloration, and dyes wool from a sulfuric acid bath very level fast blue tints. This dyestuff is a chromium compound of the dyestuff of the formula

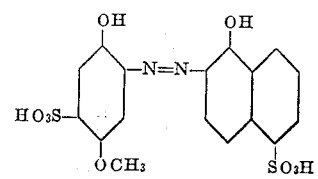

A chromiferous dyestuff having similar properties is obtained by using, instead of 1-hydroxynaphthalene-5-sulfonic acid, the same quantity of 2-hydroxynaphthalene-4-sulfonic acid and otherwise proceeding as described above.

*Example 2*

23.3 parts of 2:5-dimethoxy-1-aminobenzene-4-sulfonic acid are diazotized in the usual manner with 7 parts of sodium nitrite in the presence of 19 parts of hydrochloric acid of 30 per cent. strength. The diazo-compound is run into a solution cooled to 15° C. of 15 parts of 2-hydroxynaphthalene, 16 parts of sodium hydroxide solution of 30 per cent. strength and 20 parts of anhydrous sodium carbonate in 400 parts of water, while stirring. The greater part of the dyestuff formed precipitates and is separated by filtration. It corresponds to the formula

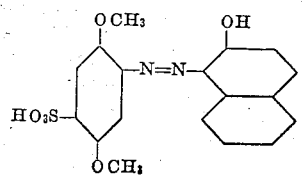

When dry it is a dark red substance which dissolves in dilute sodium carbonate solution with a red coloration and in concentrated sulfuric acid with a red-blue coloration, and dyes wool from an acid bath red tints.

This dyestuff may be converted, advantageously without preliminary drying, into its complex chromium compound. For this purpose, the dyestuff paste obtained as described above is stirred with 1000 parts of hot water and sufficient sulfuric acid of 10 per cent. strength to produce a weakly acid reaction with a mineral acid. After the addition of a quantity of chromium sulfate [Cr₂(SO₄)₃] containing 5.7 parts of Cr, the reaction mixture is heated up to 125–130° C. in a lead-lined autoclave fitted with stirring apparatus and stirred for 25 hours at that temperature. The filtered chroming solution is mixed with dilute sodium hydroxide solution until it has a neutral reaction to litmus, and then evaporated to dryness under reduced pressure. The dyestuff so obtained is a chromium compound of the dyestuff of the formula

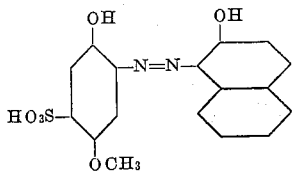

It is a dark colored substance which dissolves in dilute sodium carbonate solution with a violet coloration and in concentrated sulfuric acid with a blue coloration and dyes wool from a sulfuric acid bath very level fast red-blue tints.

The 2:5-dimethoxy - 1 - aminobenzene - 4-sulfonic acid necessary for making the above dyestuff can be obtained by sulfonating 2:5-dimethoxy-1-aminobenzene, for example, by baking the acid sulfate at about 170° C.

*Example 3*

100 parts of well wetted wool are entered at 40° C. into a dyebath which contains 1 part of the chromiferous dyestuff obtainable as described in the first and second paragraphs of Example 2, 40 parts of sulfuric acid of 10 per cent. strength and 3000 parts of water. The bath is slowly heated to the boil. After boiling for ¼ hour a further 40 parts of sulfuric acid of 10 per cent. strength are added, and dyeing is carried on at the boil for 1½ hours. The wool is then rinsed with cold water and dried. It is dyed a very level blue tint.

What we claim is:

1. A complex chromium compound of a monoazo-dyestuff containing at least one and at the most two SO₃H-groups and corresponding to the formula

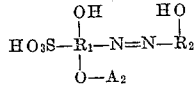

in which R₁ represents an aromatic radical of the benzene series in which the substituents —N=N—, —OH and —O—A₂ are in the 1-, 2- and 5-positions, respectively, A₂ represents an alkyl group containing up to 4 carbon atoms and

represents a member of the group consisting of a 2 - hydroxynaphthalene radical containing at most one —SO₃H-group and bound to the azo group in 1-position, and the 1-hydroxy-naphthalene-5-sulfonic acid radical bound to the azo group in 2-position.

2. A complex chromium compound of a monoazo-dyestuff containing at least one and at the most two —SO₃H-groups and corresponding to the formula

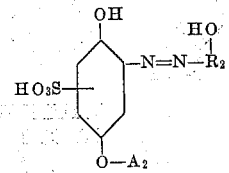

in which A₂ represents an alkyl group containing up to 4 carbon atoms and

represents a 2-hydroxynaphthalene radical containing at most one SO₃H-group and bound to the azo group in 1-position.

3. A complex chromium compound of a monoazo-dyestuff containing at least one and at the most two —SO₃H groups and corresponding to the formula

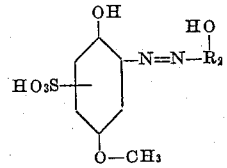

in which

represents a 2-hydroxynaphthalene radical containing at most one —SO₃H group and bound to the azo group in 1-position.

4. A complex chromium compound of a monoazo-dyestuff containing at least one and at the most two —SO₃H groups and corresponding to the formula

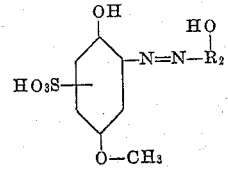

in which

represents a 2-hydroxynaphthalene radical containing at most one —SO₃H group and bound to the azo group in 1-position.

5. Complex chromium compound of the monoazo-dyestuff of the formula

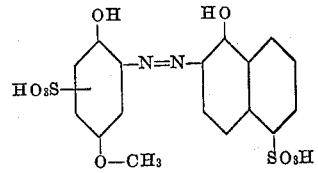

6. Complex chromium compound of the monoazo-dyestuff of the formula

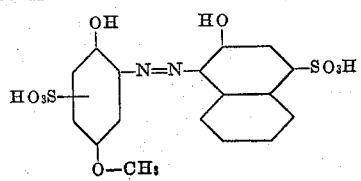

7. Complex chromium compound of the monoazo-dyestuff of the formula
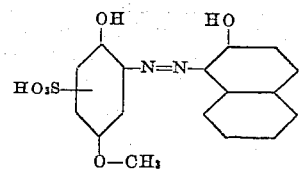
WILLY WIDMER.
JAKOB BRASSEL.
REFERENCES CITED
The following references are of record in the file of this patent:
UNITED STATES PATENTS
| Number | Name | Date |
|---|---|---|
| 865,252 | Kahn et al. | Sept. 3, 1907 |
| 1,025,267 | Heidenreich | May 7, 1912 |
| 1,038,884 | Herzberg | Sept. 17, 1912 |
| 1,440,566 | Straub | Jan. 2, 1923 |
| 2,353,675 | Knecht et al. | July 18, 1944 |
| 2,536,957 | Riat et al. | Jan. 2, 1951 |